United States Patent [19]

Karszes

[11] Patent Number: 5,362,351
[45] Date of Patent: Nov. 8, 1994

[54] METHOD OF MAKING LENTICULAR PLASTICS AND PRODUCTS THEREFROM

[76] Inventor: William M. Karszes, 2720 Roxburgh Dr., Roswell, Ga. 30076

[21] Appl. No.: 89,898

[22] Filed: Jul. 9, 1993

Related U.S. Application Data

[63] Continuation of Ser. No. 820,850, Jan. 15, 1992, abandoned.

[51] Int. Cl.$^5$ .............................................. B29C 47/06
[52] U.S. Cl. ........................ 156/243; 156/244.11; 156/244.23; 156/244.24; 156/244.25; 156/244.27; 156/306.6
[58] Field of Search ................ 156/196, 243, 244.11, 156/244.23, 244.24, 244.25, 244.27, 306.6

[56] References Cited

U.S. PATENT DOCUMENTS

| | | | |
|---|---|---|---|
| 3,146,492 | 9/1964 | Lemelson | 156/244.25 |
| 3,241,429 | 3/1966 | Rice et al. | 156/244.25 |
| 3,250,173 | 5/1966 | Henry | 156/244.25 |
| 3,317,334 | 5/1967 | Norton | 117/10 |
| 3,348,264 | 10/1967 | Rice et al. | 18/10 |
| 3,357,772 | 12/1967 | Rowland | 350/167 |
| 3,594,254 | 7/1971 | Lemelson | 156/244.25 |
| 3,635,778 | 1/1972 | Rice et al. | 156/500 |
| 3,810,729 | 5/1974 | Patchell | 425/308 |
| 4,455,184 | 6/1984 | Thompson | 156/244.11 |
| 4,498,736 | 2/1985 | Griffin | 425/308 |
| 4,668,571 | 5/1987 | Moriarty | 156/244.11 |

*Primary Examiner*—Caleb Weston
*Attorney, Agent, or Firm*—Needle & Rosenberg

[57] ABSTRACT

A process for forming a lenticular-coated substrate, and the lenticular-coated substrate manufactured from this process, is provided comprising the steps of continuously advancing a plastic substrate film having an upper side and a lower side past an extrusion station; continuously coextruding a molten thermoplastic tie resin and a molten thermoplastic lenticular resin onto the upper side of the substrate film from the extrusion station to form a composite comprising a substrate layer, a tie layer and a lenticular layer such that the tie layer is superposed on the substrate film and the lenticular layer is superposed on the tie layer; and continuously advancing the composite past a chill roll to form the lenticular-coated substrate such that the lenticular layer of the composite contacts the chill roll to form a lenticular pattern. Further, an improved process for producing a three-dimensional image is provided comprising the additional steps of cutting the lenticular pattern having equally spaced lines onto the chill roll with a precision gravure engraving machine; color separating an image to produce a multiplicity of color-separated images; for each color-separated image, engraving with the precision gravure engraving machine a gravure dot pattern with line spacings identical to the lenticular pattern onto a gravure print cylinder; and printing the image onto the lower side of the substrate film so that the gravure dot pattern of each gravure print cylinder is in registration with the lenticular pattern of the chill roll to produce the three-dimensional image.

34 Claims, 1 Drawing Sheet

METHOD OF MAKING LENTICULAR PLASTICS AND PRODUCTS THEREFROM

This application is a continuation of application Ser. No. 07/820,850, filed Jan. 15, 1992 now abandoned.

BACKGROUND OF THE INVENTION

The present invention relates to a coextrusion method for forming multiple layered plastic film and the products formed therefrom. In particular, this invention relates to a process, and the products formed thereof, for forming a lenticular-coated substrate, a lenticular strippable plastic-coated substrate or a nonlenticular strippable plastic-coated substrate that involves coextruding a molten thermoplastic tie resin and a molten thermoplastic lenticular resin onto a plastic substrate film. This invention further relates to a process, and the three-dimensional image formed thereof, for producing a three-dimensional image that entails printing an image onto the coextruded lenticular-coated substrate from gravure print cylinders that have been engraved with a gravure dot pattern having line spacings identical to the lenticular pattern of the coextruded lenticular-coated substrate, which lenticular pattern is cut into the chill roll with a precision gravure engraving machine, so that the gravure dot pattern is in exact registration with the lenticular pattern.

In general, known extrusion processes for making multilayered lenticular-coated substrates are limited to either multi-pass extrusion coating processes, or tandem extrusion coating processes. In either case, each particular layer, such as a tie layer or a lenticular layer, is extruded onto a substrate or a previously layered substrate followed by passage of the resulting product over a chill roll, such as a tie layer chill roll or a lenticular layer chill roll, to set the particular layer prior to extrusion of a subsequent layer. Thus, a separate chill roll is needed for each layer that is extruded onto the substrate and each layer is chilled appropriately prior to extrusion of a subsequent layer.

However, in either multi-pass or tandem extrusion coating processes, because each layer is cooled prior to the extrusion of the next layer, the processes inherently produce a product that contains bubbles or voids between the various layers. Consequently, when the multi-layered lenticular-coated substrates are employed to produce a three-dimensional image, these defects lead to a end product with lowered optical quality because the bubbles or voids distort the photographic imagery or lead to undesired star patterns in over-laminated or direct printed imagery.

Furthermore, the additional cost attributable to the presence of multiple heating and cooling cycles employed in multi-pass or tandem extrusion processes is undesired. Also, because these processes employ multiple heating and cooling cycles, flexibility with respect to the chemical composition and/or thickness of the various extruded layers is limited. For instance, a minimum thickness for the lenticular layer in either a tandem or multi-pass extrusion system is necessary to reduce the number of voids between the tie and lenticular layers. This lack of flexibility leads to less than optimum control over the handability and curl of the resulting product.

Lenticular-coated substrates can also be made on sheet lines or the lenticular layer can be cast using thermosetting resins. However, in the case of sheet line lenticular, the resin systems used usually include slip additives whose addition can lead to serious problems, such as lenticular-coated substrates in which surfaces are not optimally receptive to ink and/or adhesive promoters, when the product is used in various end applications. Furthermore, a sheet line process leads to unrestrained shrinkage during the cooling cycle and, thus, deformation of the lenses. Casting of thermoset resins is undesirable because this process is relatively slow and employs expensive resins.

One particular end application of lenticular-coated substrate involves the ability to strip the tie and lenticular layers, which are bonded together as a unit, from the substrate after the product is formed. These products are particularly useful to produce photographic masters. In this application, the master is photographically shot through the strippable lenticular. The lenticular layer is then peeled off and the "fuzzy" photographic reproduction is used to produce the four color separation for printing. A variant of this end application involves the production of a strippable multi-layered non-lenticular-coated substrate in which the lenticular layer (alternatively referred to as the carrier layer) does not contain a lenticular pattern. These products are particularly useful for producing merchandising material that offers a peelable advertising device, such as coupon material. These lenticular and non-lenticular strippable films are capable of being processed in other operations, such as slitting, printing or adhesive bonding, prior to being separated along the interface between the substrate and the tie layer.

Conventional techniques for manufacturing these strippable films rely on the use of lacquer-coated adhesive bonding or pattern adhesives using weak adhesives. However, these techniques result in products that possess nonuniform properties, such as nonuniform optical patterns or variable bonding of the tie/lenticular layers to the substrate. This nonuniformity produces distracting results to the viewer; patterned adhesives are not suitable for any optical application because of this nonuniformity.

Another end application of lenticular-coated substrate involves the use of the lenticular-coated substrate in three-dimensional imagery produced by gravure printing. In order to produce a three-dimensional image by this technique, registration of the print pattern to the lenticular pattern is necessary. Conventional methods of three-dimensional gravure printing include maintaining the registration of the gravure dot patterns and the lenticular pattern by mechanical means on the press without exact registration of all tooling from start to finish. Alternatively, the image can be printed and then over-laminated, again controlling the registration manually.

However, these methods produce three-dimensional images of less than optimal optical quality because of inexact registration. In particular, moiré patterns are a typical defect in these products. Furthermore, because the gravure dot patterns cannot be accurately matched to the lenticular pattern, low lense numbers, typically 80 to 120 lpi, are used to allow for this error, leading to further degradation of the optical image. In addition, the low lense count employed necessitates the use of thicker lenticular layers, leading to cost inefficiencies.

Thus, there exists a need for a process for forming a lenticular-coated substrate which capitalizes on the advantages of an extrusion-based system but yet produces a product that can be manufactured to a higher quality at a lower cost, particularly for use of in three-dimensional photographic, computer or printed image processes. In particular, there exists a need for an extrusion process which minimizes the presence of bubbles or voids between the layers while increasing flexibility with respect to the chemical composition and thickness of the layers. Ideally, the shape, thickness and lenticular line count can be varied extensively to suit the ultimate end application of the lenticular-coated substrate formed without degrading the optical qualities of the lenticular-coated substrate.

Additionally, there exists a need for a process for forming a strippable plastic film, either a lenticular-coated substrate or a nonlenticular-coated substrate, which produces a product with uniform lenticular patterns or bonding characteristics, particularly for use in optical applications.

Further, there exists a need for a process of producing a three-dimensional gravure-printed image in which exact registration of the gravure dot pattern and the lenticular pattern is maintained to allow for manufacture of an image of high optical quality. In particular, there exists a need for a process capable of producing low-cost three-dimensional images that are substantially devoid of moiré patterns and which exhibit accurate and reproducible colors. Additionally, there exists a need for a process capable of producing three-dimensional images printed at high resolution, particularly higher than 500 dots per inch.

SUMMARY OF THE INVENTION

According to the present invention, there is provided a process for forming a lenticular-coated substrate, and the lenticular-coated substrate manufactured from this process, comprising the steps of continuously advancing a plastic substrate film having an upper side and a lower side past an extrusion station; continuously coextruding a molten thermoplastic tie resin and a molten thermoplastic lenticular resin onto the upper side of the substrate film from the extrusion station to form a composite comprising a substrate layer, a tie layer and a lenticular layer such that the tie layer is superposed on the substrate film and the lenticular layer is superposed on the tie layer; and continuously advancing the composite past a chill roll to form the lenticular-coated substrate such that the lenticular layer of the composite contacts the chill roll to form a lenticular pattern. According to a preferred embodiment of the present invention, the substrate film comprises an optically clear film, the tie resin comprises a clear adhesive polymer, the lenticular resin comprises a clear polymer, the thickness of the lenticular-coated substrate ranges from about 2.5 mils to about 20 mils, the ratio of the thickness of the substrate layer to the sum of the thickness of the tie layer and the thickness of the lenticular layer ranges from about 0.5:1 to about 1:1, and the ratio of the thickness of the lenticular layer to the thickness of the tie layer ranges from about 9:1 to about 4:1.

In addition, according to alternative embodiments of the present invention, the substrate film is chemically pretreated on the upper side so as to inhibit bonding of the substrate layer to the tie layer and/or the upper side of the substrate film is sufficiently dissimilar from the tie resin to prevent chemical bonding between the film and the resin at temperatures less than about 650° F. so as to produce a strippable lenticular-coated substrate (or nonlenticular-coated substrate) in which the force of adhesion between the tie layer and the substrate layer ranges from about 25 g/in to about 450 g/in. Preferred embodiments include the use of MELINEX 504 ® as the pretreated substrate film and ethylene methyl ethyl acrylate as the tie layer.

Moreover, the instant invention provides for an improved process for producing a three-dimensional image. Thus, in addition to the steps given above for producing a lenticular-coated substrate, the instant invention provides for the additional steps of cutting the lenticular pattern having equally spaced lines onto the chill roll with a precision gravure engraving machine; color separating an image to produce a multiplicity of color-separated images; for each color-separated image, engraving with the precision gravure engraving machine a gravure dot pattern with line spacings identical to the lenticular pattern onto a gravure print cylinder; and printing the image onto the lower side of the substrate film so that the gravure dot pattern of each gravure print cylinder is in registration with the lenticular pattern of the chill roll to produce the three-dimensional image. According to a preferred embodiment, the gravure dot pattern comprises greater than 150 dots per inch, more preferably greater than about 400-500 dots per inch.

Thus, it is an object of the present invention to provide a new process for forming a lenticular-coated substrate in which the problems of the prior art discussed above have been solved. In particular, the optical quality of the product is greatly enhanced by the coextrusion process of the instant invention because the resultant product is virtually free of bubbles and voids between the tie layer and the lenticular layer. Additionally, because only one chill roll is necessary, the instant invention provides a more economical process. Moreover, because the heating/cooling cycle of the instant coextrusion process can be run at a cooler temperature, the lenticular-coated substrate product of the instant invention possesses greater handability and less curl. Furthermore, because the tie layer never comes into contact with the chill roll, the ratio of the thickness of the tie layer to the thickness of the lenticular layer can be extensively varied and the choice of resins and substrates is greatly enhanced. Thus, it is an object of the instant invention to provide high optical quality lenticular-coated substrates in which the amount of plastic needed can be minimized, which are more economical to produce, and which are capable of being optimally designed for a particular end application.

With respect to strippable lenticular or nonlenticular plastics, it is a further object of the instant coextrusion process is to produce a strippable multilayered product with good optical qualities in which the level of strippability can be varied from virtually zero bond strength to over 450 between the substrate and the tie/lenticular layers. Furthermore, it is an object of the present invention to provide for control over the degree of uniform adhesive bonding between the tie layer and the substrate layer in the strippable lenticular- or nonlenticular-coated substrate by either coextruding onto a substrate that has been pretreated so as to inhibit bonding of the substrate layer to the tie layer, selecting the appropriate chemical composition of the tie resin for the desired strippability, selecting the temperature at which the coextrusion takes place, and/or varying the amount of corona treatment of the substrate film prior to the coextrusion.

It is yet another object of this invention to provide a process of forming a lenticular-coated substrate onto which a image has been printed from gravure print cylinders in such a manner that the lenticular pattern is in exact registration with the gravure dot pattern of each gravure print cylinder to provide a three-dimensional image of high optical quality. Particular objects of the instant invention include providing a process for producing a three-dimensional image, and a three-dimensional image produced by the process, in which moiré patterns are substantially eliminated, the gravure dot patterns are held at essentially 45°, the accuracy and reproducibility of the colors is enhanced, the density of the gravure dot pattern is greater than 180 dots per inch (particularly greater than 400 dots per inch) and the thickness of the lenticular-coated substrate is reduced (and thus the cost of producing the product) while still maintaining good optical properties.

DETAILED DESCRIPTION OF THE INVENTION

As used herein, the term "exact registration" as applied to registration of a lenticular pattern to gravure dot patterns during the gravure printing of three-dimensional images refers to the degree of registration accuracy obtainable in a printing process in which the gravure cylinders employed have been tooled on the same machine and with the same spacings as the chill roll which provides the lenticular pattern; these procedures allow registration accuracy of the print pattern to be within 10% of the center of the lenticules. Typically, exact registration allows printing at greater than 180 dots per inch, such as from 400 to 500 dots per inch, without loss of optical quality. Optical quality is judged by the depth of the three-dimensional imagery as well as the sharpness of the imagery. Loss of registration results in loss of depth and the presence of fuzzy areas in the image.

Figure 1:
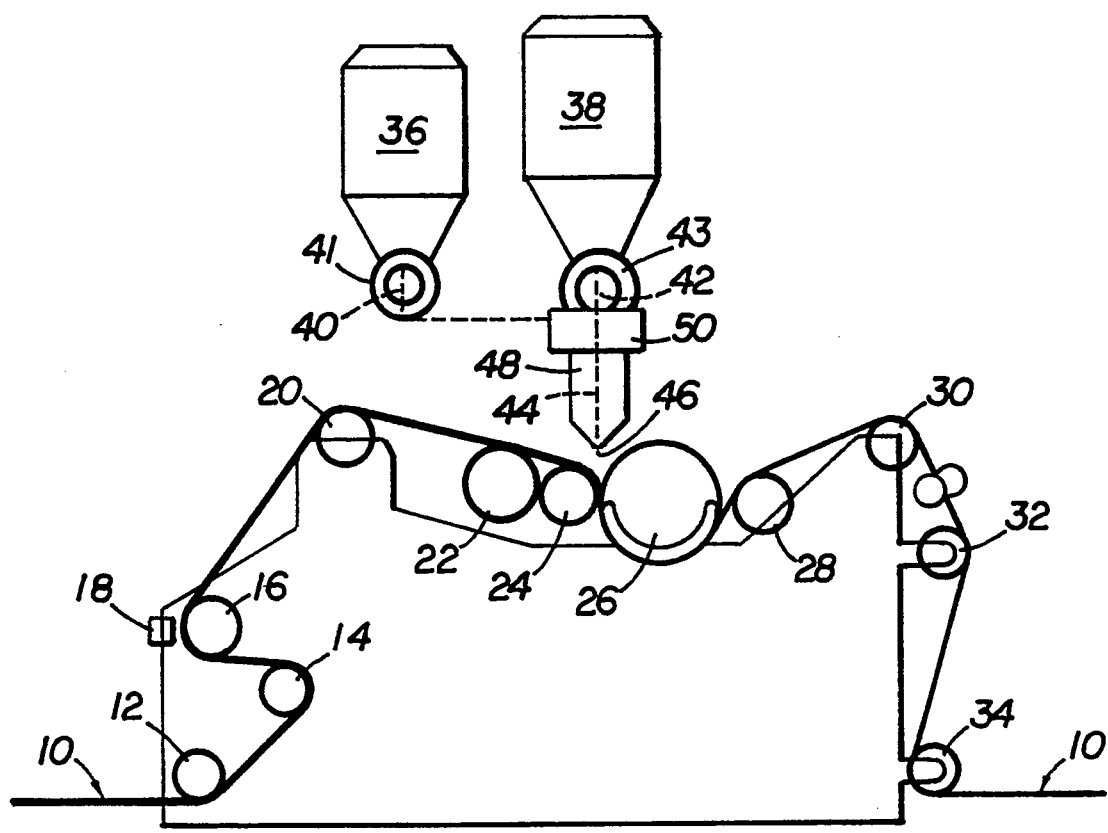
FIG. 1 is a schematic view of a representative apparatus and associated film thread path capable of being used according to the coextrusion process of the instant invention.

The present invention provides a novel coextrusion process for forming a lenticular-coated substrate and the products formed therefrom. Referring to FIG. 1, which schematically shows a representative typical apparatus, including a film thread path, that can be utilized in this method, and FIG. 2, which shows a cross section of a typical lenticular-coated substrate formed from the process, the lenticular-coated substrate is formed by (A) continuously advancing a plastic substrate film 110 having an upper side 118 and a lower side 116 along film thread path 10 past guide rollers 12, 14, 16, 20 and 22 and over nip roll 24; (B) continuously advancing the plastic substrate past the extrusion station; (C) continuously coextruding a molten thermoplastic tie resin and a molten thermoplastic resin through die opening 46 onto the upper side 118 to form a composite comprising a substrate layer 110, a tie layer 112 and a lenticular layer 114 such that the tie layer 112 is superposed on the substrate layer 110 and the lenticular layer 114 is superposed on the tie layer 112; and (D) continuously advancing the composite between nip roll 24 and chill roll 26 and past chill roll 26 such that the lenticular layer 114 of the composite contact chill roll 26 to form a lenticular pattern thereon. Typically, the lenticular-coated substrate is then advanced continuously past other guide rollers, such as guide rollers 28, 30, 32 and 34, and is subjected to various post-formation treatments, such as edge trimming, corona treatment, various additional coatings or extrusions, and drying, before being taken up on a winder spool. Also, the substrate film can be subjected pre-formation processes, such as corona treatment from means for corona treatment 18, prior to the coextrusion step. Following formation of the lenticular-coated substrate or prior to the coextrusion step, a balancing layer or a subbing layer resin can be extruded onto the lower side 116 of the substrate film to minimize curl in the lenticular-coated substrate or to act as an adhesive receptive layer, respectively.

Referring again to FIG. 1, the tie resin flows from tie resin reservoir 36 through tie resin flange 41 and tie resin adapter 40; the lenticular resin flows from lenticular resin reservoir 38 through lenticular resin flange 43 and lenticular resin adapter 42. The two resins contact each other in "black box" 50 and then flow through conduit 44 in die 48 and die opening 46. The composition, temperature, pressure and flow rate of the tie resin and lenticular resin are selected so that little or no shear exists at the interface between the tie resin and the lenticular resin when they contact each other.

Any type of coextrusion apparatus can be used in the process of this invention so long as the coextruder is capable of coextruding the molten thermoplastic tie resin and the molten thermoplastic resin onto the substrate film to form the layers of the composite. Typically, the L/D ratio of the extruder is approximately 28:1, the thickness of the die opening varies from 10 to 50 mils depending upon the composition of the tie and lenticular resins and the intended end application for the lenticular-coated substrate, and the apparatus is capable of processing substrate films that are from about 24 inches to 50 inches wide. The speed at which the substrate film continuously advances through the apparatus depends upon the thicknesses of the various layers of the composite, how quickly the composite cools and various mechanical considerations; typically, the substrates moves at speeds between about 40 to 250 ft/min.

The plastic substrate films suitable for use in this invention include any clear plastic film, particularly any optically clear film. The particular film used depends, in large part, upon characteristics, such as strength, curl, thermostability, lifetime or low cost, that are desired for the end application of the lenticular-coated substrate. For instance, biaxially oriented films typically give good mechanical stability but are relatively expensive while non-oriented films give less strength but are usually considerably less costly. Typical examples of suitable plastic substrate films include but are not limited to biaxially oriented polyester film, biaxially oriented polypropylene film, non-oriented polypropylene film and non-oriented polyethylene terephthalate film. Coated or pretreated plastic films, such as MELINEX 504 ® (ICI, Wilmington, Del.) are useful to control the degree of adhesion between the substrate film and the tie layer.

The thermoplastic tie resins suitable for use in this invention include clear adhesive polymer that can be extruded. The tie resin used to manufacture a particular lenticular-coated substrate is selected primarily based upon the end application of the lenticular-coated substrate and the resin's cost, clarity and ability to adhesively bridge the substrate film and lenticular layer. Additionally, the tie resin must be compatible with the selected lenticular resin from a coextrusion point of view; the rheology of these two resins must match so as to enable the two resins to flow together with little or no shear. Typical examples of tie resins include but are not limited to ethylene n-butyl acrylate, ethylene methyl butyl acrylate, ethylene methyl ethyl acrylate, IONOMER ® (DuPont, Wilmington, Del.), and mixtures containing these adhesives. For example, varying mixtures of polypropylene and one or more of the above listed adhesives is useful to vary the force of adhesion between the substrate film and the tie layer. In addition to the adhesives used in conventional multipass or tandem extrusion processes, the tie resins of the instant invention also can include stronger adhesives because, contrary to these conventional techniques, the tie resin of the instant invention does not contact the chill roll and, therefore, does not have to have a surface (e.g., matte) capable of being stripped from the chill roll. Similarly, because the tie resin and the lenticular resin of the instant invention contact each other when they are molten, a greater variety of tie resins are suitable for use in the instant invention compared to conventional techniques. Both of these factors allow the tie layer of the instant invention to be thinner, thus cheaper, and optically clearer than corresponding layers formed from conventional processes. Further, coextrusion allows for a thinner tie layer because the tie layer is extruded simultaneously with the lenticular layer and, thus, does not have to have the bulk required in conventional tandem or dual pass systems.

The thermoplastic lenticular resins suitable for use in this invention include any clear polymer that can be extruded. The lenticular resin used to manufacture a particular lenticular-coated substrate is selected primarily based upon the end application of the lenticular-coated substrate and the resin's ease of processing, mar resistance, clarity, and cost. As with the tie resin, the lenticular resin must be compatible with the selected tie resin from a coextrusion point of view; the rheology of these two resins must match so as to enable the two resins to flow together with little or no shear. Typical examples of lenticular resins include but are not limited to polypropylene, polycarbonate, polyethylene, polystyrene, polyvinyl chloride, and mixtures containing these polymers. Balancing layer resins suitable for use in this invention include those resins specified above for lenticular resins. Subbing resins and/or films are any clear uniform substance which meet the end use application, such as ink, gel emulsion or adhesive receptability.

Figure 2:
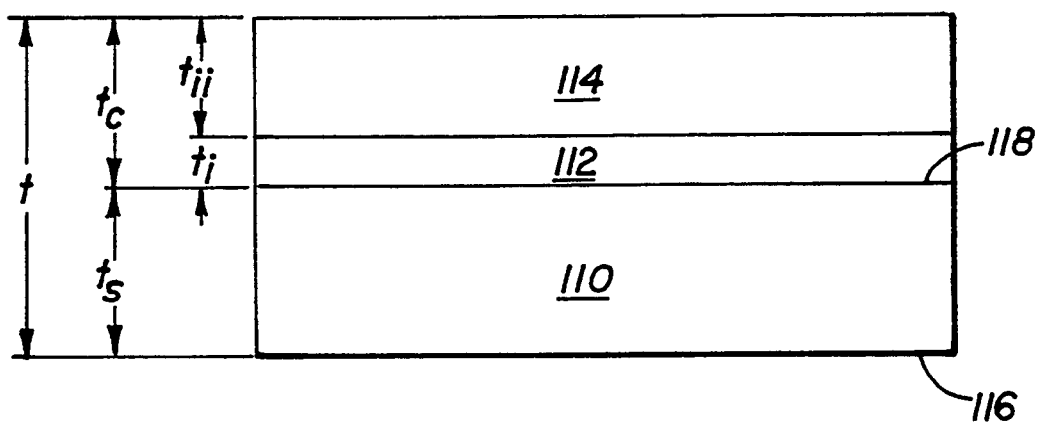
FIG. 2 is a cross-section of one embodiment of the substrate film/tie layer/lenticular layer composite according to the instant invention.

Referring to FIG. 2, the thickness of the lenticular-coated substrate (t) of the instant invention preferably varies from about 2.5 mils to about 20 mils. Similarly, the ratio of thickness of the substrate layer ($t_s$) to the thickness of the coextruded layers ($t_c$; i.e., the sum of the thickness of the tie layer ($t_i$) and the thickness of the lenticular layer ($t_{ii}$)) preferably varies from about 0.5:1 to about 1:1 and the ratio of the thickness of the lenticular layer ($t_{ii}$) to the thickness of the tie layer ($t_i$) varies from about 9:1 to about 4:1. Furthermore, $t_c$ should not be less than 2.5 times the depth of the lenticles. In order to minimize curl, $t_c$ should not be greater than $t_s$.

If a subbing layer is extruded onto the lower side 116 of the substrate film, the curl in the resulting product is most effectively minimized if the subbing layer is approximately the same thickness as the coextruded layers taken together ($t_c$). A typical example is: $t_c=6.5$ inches, $t_s=7$ inches, and the subbing layer thickness=6.5 inches.

The melt temperature of the tie resin and the lenticular resin in the extrusion station preferably ranges from about 500° F. to about 650° F., more preferably from about 550° F. to about 650° F; melt temperatures from about 500° F. to about 600° F. tend to result in a lower force of adhesion between the tie layer and the substrate layer. Typically, the temperature of the lenticular-coated substrate as it comes off the chill roll 26 ranges from about 80° F. to about 110° F. The lenticular pattern, which is cut into the chill roll 26 and impressed into the composite as it passes by, is determined by the end application of the lenticular-coated substrate; typically, the lenticular pattern ranges from about 20 lines/inch to about 400 lines/inch.

In order to produce a strippable lenticular (or nonlenticular) product, the substrate film and the tie resin can be chosen such that their chemistry is sufficiently dissimilar to prevent chemical bonding between the film and the resin at the extrusion temperature (i.e., less than about 650° F.). Thus, these components can be chosen such that the force of adhesion between the tie layer and the substrate layer ranges from about 25 g/in to about 450 g/in, more preferably from about 50 g/in to about 150 g/in, to provide for a lenticular-coated substrate in which the substrate layer can be stripped from the coextruded layers.

For instance, the substrate film can be either a high temperature nonpolar material or contain only weak polar groups while the tie resin is either a weak adhesive or comprises a nonpolar (such as polyethylene) material. Furthermore, the combination of relatively noninteractive substrate and tie layers combined with coextruding at lower temperatures (i.e., about 500° F. to about 600° F.) prevents formation of strong chemical bonds between the substrate layer and the tie layer.

Furthermore, the tie resin can be comprised of a mixture of polypropylene or other nonpolar polymers and an adhesive polymer, wherein the concentration of the adhesive polymer can be varied (e.g., from about 0 to 20%) to control the force of adhesion between the tie layer and the substrate layer. Typical adhesive polymers used in this manner comprise polymers such as ethylene methyl ethyl acrylate, ethylene n-butyl acrylate, ethylene methyl butyl acrylate and their mixtures. For example, using MELINEX 504 ® or MELINEX 813 ® as the substrate film and a mixture of polypropylene and ethylene n-butyl acrylate as the tie resin, as the percent ethylene n-butyl acrylate was increased from 0% to 20%, the force of adhesion between the substrate layers and the coextruded layers increased from about 50 g/in to about 200 g/in.

Additionally, a pretreated substrate film can be used in which the pretreatment inhibit bonding of the substrate layer to the tie layer to produce a strippable lenticular (or nonlenticular) product. For instance, MELINIX 504 ®, which is a plastic film that has been primed for solvent ink acceptance on the upper side, has been found to inhibit bonding of the substrate layer to the tie layer. Suitable tie resins used in combination with this film include ethylene methyl ethyl acrylate. Furthermore, exposure of the upper side of the pretreated substrate film, such as MELINEX 504 ®, to corona treatment prior to coextrusion onto the substrate can be used to control the force of adhesion between the substrate layer and the tie layer. For example, the force of adhesion between the substrate layer (MELINEX 504®) and the tie layer (ethylene methyl ethyl acrylate) varied from about 125 g/in to about 250 g/in as the MELINEX 504® was exposed to 0 kW to 2.5 kW of corona treatment, respectively. Above 2.5 kW, the force of adhesion decreased and leveled off at about 200 g/in.

In another embodiment of the instant invention, the lenticular-coated substrate is further processed to produce a superior quality three-dimensional image. In order to manufacture quality three-dimensional imagery, registration of the print pattern to the lenticular pattern is necessary. It has now been found that exact registration of the print pattern to the lenticular pattern can be achieved by employing a chill roll that has been tooled on a modified electronic gravure engraver, such as those produced by Ohio Electronic Engraver (Dayton, Ohio), to produce the lenticular pattern of the lenticular-coated substrate in combination with printing from gravure print cylinders in which the gravure dot pattern has been engraved with line spacings identical to the chill roll lenticular pattern. Because electronic engraving allows a high degree of accuracy in matching the tooling accuracy for the chill roll and the print cylinders, exact registration of the print pattern to the lenticular pattern can be obtained. Because of the high registration accuracy obtainable by cutting all cylinders on the same machine with line spacings held constant relative to the accuracy of the electronics, it is not necessary to use low lense numbers for the lenticular pattern, e.g., 80 to 120 lpi, to allow for inexact registration. Furthermore, because gravure printing rather than lithographic or other conventional printing means are employed, printing at greater than 180 dots/in, preferably greater than about 400-500 dots/in is possible. The higher lens numbers and density of the gravure dot pattern obtainable with this process provides for a three-dimensional image superior quality; not only is the image of much higher resolution, moiré patterns are eliminated and the colors reproduced more accurately. Further, because printing at a high dot density is possible, the thickness of the lenticular-coated substrate can be reduced while still allowing for a focused image. For instance, focused products can be produced using 16 mil lenticular-coated substrate and 180 lpi; 12.5 mil lenticular-coated substrate and 220 lpi; and 5 mil lenticular-coated substrate and 300 lpi.

Thus, this embodiment of the instant invention provides a process for producing a three-dimensional image which, in addition to the steps discussed above for producing the lenticular-coated substrate, calls for (A) cutting the lenticular pattern onto the chill roll with a precision gravure engraving machine such that the lenticular pattern comprises equally spaced lines; (B) color separating an image to produce a multiplicity of color-separated images; (C) for each color-separated image, engraving a gravure dot pattern with line spacings identical to the lenticular pattern onto a gravure print cylinder; and (D) printing the image onto the lower side 116 of the substrate film. Alternatively, a paper substrate on which the image has been printed can be utililized with the tie and lenticular layers coextruded onto it. Additionally, the lenticular-coated substrate can be manufactured and then used to overlay the image that has been printed on either paper, opaque plastic, or clear plastic.

The present invention is more particularly described in the following examples which are intended as illustrative only since numerous modifications and variations therein will be apparent to those skilled in the art.

Example 1-Lenticular-coated substrate

A lenticular-coated substrate having a thickness of 10.5 mil in which the substrate layer consists of MELINEX 504® (7 mil; treated side on lower side of the substrate layer, ICI, Wilmington, Del.), the tie layer consists of ethylene n-butyl acrylate (1 mil, Quantum Chemical, Cincinnati, Ohio) and the lenticular layer consists of polypropylene (2.5 mils, Eastman Chemical, Kingsport, Tenn.) can be produced by the method of the instant invention. Both extruders have a 570° F. heat profile, the flange is 580° F., the adapter is 580° F., the neck is 580° F. and the die profile is 585° F., 580° F., 580° F., 580° F. and 585° F. The tie resin melt is at 1092 psi and 595° F. and the lenticular resin melt is at 1748 psi and 603° F.

Example 2-Lenticular-coated substrate with balancing layer

A lenticular-coated substrate having a thickness of 16 mil in which the substrate layer consists of Mylar Type 'O' (7 mil; Dupont, Wilmington, Del.), the tie layer consists of ethylene n-butyl acrylate (1 mil, Chevron, Orange, Tex.) and the lenticular layer consists of polypropylene (3.5 mils, Eastman Chemical, Kingsport, Tenn.) and the balancing layer consists of coextruded ethylene n-butyl acrylate (1 mil, Chevron, Orange, Tex.) and polypropylene (3.5 mils, Quantum Chemical, Cincinnati, Ohio) can be produced by the method of the instant invention. Both tie and lenticular extruders have a 570° F. heat profile, the flange is 580° F., the adapter is 580° F., the neck is 580° F. and the die profile is 585° F., 580° F., 580° F., 580° F. and 585° F. The tie resin melt is at 1092 psi and 595° F. and the lenticular resin melt is at 1748 psi and 603° F. The balancing ethylene n-butyl acrylate extruder has a 570° F. profile, the balancing polypropylene extruder has a 540° F. profile, the flange is 570° F., the adapter is 570° F., the neck is 570° F. and the die profile is 570° F., 570° F., 570° F., 570° F. and 570° F. The ethylene n-butyl acrylate resin melt is at 1553 psi and 585° F. and the polypropylene resin melt is at 1269 psi and 584° F.

Example 3-Strippable lenticular-coated substrate

A strippable lenticular-coated substrate having a thickness of 10.5 mil in which the substrate layer consists of MELINEX 504® (7 mil; treated side on upper side of the substrate layer, ICI, Wilmington, Del.), the tie layer consists of ethylene n-butyl acrylate (1 mil, Quantum Chemical, Cincinnati, Ohio) and the lenticular layer consists of polypropylene (2.5 mils, Eastman Chemical, Kingsport, Tenn.) can be produced by the method of the instant invention. Both extruders have a 570° F. heat profile, the flange is 580° F., the adapter is 580° F., the neck is 580° F. and the die profile is 585° F., 580° F., 580° F., 580° F. and 585° F. The tie resin melt is at 1092 psi and 595° F. and the lenticular resin melt is at 1748 psi and 603° F.

Example 4-Strippable lenticular-coated substrate

A strippable lenticular-coated substrate having a thickness of 10.5 mil in which the substrate layer consists of MELINEX 813® (7 mil; treated side on upper side of the substrate layer, ICI, Wilmington, Del.), the tie layer consists of ethylene n-butyl acrylate (1 mil, Quantum Chemical, Cincinnati, Ohio) and the lenticular layer consists of polypropylene (2.5 mils, Eastman Chemical, Kingsport, Tenn.) can be produced by the method of the instant invention. The tie resin extruder has a 570° F. profile, the lenticular resin has a 540° F. profile, the flange is 570° F., the adapter is 570° F., the neck is 570° F. and the die profile is 570° F., 570° F., 570° F., 570° F. and 570° F. The tie resin melt is at 1553 psi and 585° F. and the lenticular resin melt is at 1269 psi and 584° F.

Example 5-Gravure three-dimensional printing

A gravure three-dimensional image produced according to this invention consists of a 4.5 mil coextruded layer (1 mil tie layer, ethylene n-butyl acrylate, Quantum Chemical, Cincinnati, Ohio and 3.5 mil lenticular layer, polypropylene, Eastman Chemical, Kingsport, Tenn.) on #40 paper with 360 lpi printing. Both extruders have a 570° F. heat profile, the flange is 580° F., the adapter is 580° F., the neck is 580° F. and the die profile is 585° F., 580° F., 580° F., 580° F. and 585° F. The tie resin melt is at 1092 psi and 595° F. and the lenticular resin melt is at 1748 psi and 603° F.

Although the present process has been described with reference to specific details of certain embodiments thereof, it is not intended that such details should be regarded as limitations upon the scope of the invention except as and to the extend that they are included in the accompanying claims.

What is claimed is:

1. A process for forming a lenticular-coated substrate comprising the steps of:
    a) continuously advancing a plastic substrate film past an extrusion station, wherein the substrate film has an upper side and a lower side;
    b) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer; and
    c) continuously advancing the composite past a chill roll to form the lenticular-coated substrate, wherein the lenticular layer of the composite contacts the chill roll to form a lenticular pattern thereon;
    wherein the thickness of the lenticular-coated substrate ranges from about 2.5 mils to about 20 mils and the ratio of the thickness of the substrate layer to the sum of the thickness of the tie layer and the thickness of the lenticular layer ranges from about 0.5:1 to about 1:1 and the ratio of the thickness of the lenticular layer to the thickness of the tie layer ranges from about 9:1 to about 4:1.

2. The process of claim 1, wherein the melt temperature of the tie resin and the lenticular resin in the extrusion station ranges from about 550° F. to about 650° F.

3. The process of claim 1, wherein the substrate film comprises an optically clear film.

4. The process of claim 3, wherein the substrate film is selected from the group consisting of biaxially oriented polyester film, biaxially oriented polypropylene film, non-oriented polypropylene film and non-oriented polyethylene terephthalate film.

5. The process of claim 1, wherein the tie resin comprises a clear adhesive polymer.

6. The process of claim 5, wherein the tie resin is selected from the group consisting of methyl ethyl acrylate, ethylene n-butyl acrylate, ethylene methyl butyl acrylate, IONOMER ®, and mixtures thereof.

7. The process of claim 1, wherein the lenticular resin comprises a clear polymer.

8. The process of claim 7, wherein the lenticular resin is selected from the group consisting of polypropylene, polycarbonate, polyethylene, polystyrene, polyvinyl chloride and mixtures thereof.

9. The process of claim 1, wherein the lenticular pattern ranges from 20 lines/inch to 400 lines/inch.

10. A process for producing a three-dimensional image, comprising the steps of:
    a) cutting a lenticular pattern onto a chill roll with a precision gravure engraving machine, wherein the lenticular pattern comprises equally spaced lines;
    b) color separating an image to produce a multiplicity of color-separated images;
    c) for each color-separated image, engraving a gravure dot pattern with line spacings identical to the lenticular pattern onto a gravure print cylinder to form a multiplicity of engraved gravure print cylinders;
    d) printing the image onto a paper substrate from the multiplicity of engraved gravure print cylinders so that the gravure dot pattern of each gravure print cylinder is in registration with the lenticular pattern of the chill roll;
    e) continuously advancing the paper substrate past an extrusion station, wherein the paper substrate has an upper side and a lower side;
    f) continuously coextruding a molten thermoplastic tie resin and a molten thermoplastic lenticular resin onto the upper side of the paper substrate from the extrusion station to form a composite comprising a substrate layer, a tie layer and a lenticular layer, wherein the tie layer is superposed on the substrate film and the lenticular layer is superposed on the tie layer; and
    g) continuously advancing the composite past the chill roll, wherein the lenticular layer of the composite contacts the chill roll to form the lenticular pattern thereon to form the three-dimensional image.

11. A process for producing a three-dimensional image, comprising the steps of:
    a) cutting a lenticular pattern onto a chill roll with a precision gravure engraving machine, wherein the lenticular pattern comprises equally spaced lines;
    b) color separating an image to produce a multiplicity of color-separated images;
    c) for each color-separated image, engraving a gravure dot pattern with line spacings identical to the lenticular pattern onto a gravure print cylinder to form a multiplicity of engraved gravure print cylinders;
    d) continuously advancing a plastic substrate film past an extrusion station, wherein the substrate film has an upper side and a lower side;
    e) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer;
    f) continuously advancing the composite past the chill roll to form a lenticular-coated substrate, wherein the lenticular layer of the composite contacts the chill roll to form the lenticular pattern thereon;

g) printing the image onto paper, opaque plastic film or clear plastic film from the multiplicity of engraved gravure print cylinders so that the gravure dot pattern of each gravure print cylinder is in registration with the lenticular pattern of the chill roll; and h) overlaying the printed image with the lenticular-coated substrate to form the three-dimensional image.

12. A process for forming a lenticular-coated substrate comprising the steps of:

a) continuously advancing a plastic substrate film past an extrusion station, wherein the substrate film has an upper side and a lower side;

b) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer; and c) continuously advancing the composite past a chill roll to form the lenticular-coated substrate, wherein the lenticular layer of the composite contacts the chill roll to form a lenticular pattern thereon;

wherein the substrate film is a film that is chemically pretreated on the upper side so as to inhibit bonding of the substrate layer to the tie layer to produce a strippable lenticular-coated substrate in which the force of adhesion between the tie layer and the substrate layer ranges from about 25 g/in to about 450 g/in.

13. The process of claim 12, wherein the force of adhesion between the tie layer and the substrate layer ranges from abut 50 g/in to about 150 g/in.

14. The process of claim 12, wherein the pretreated substrate film comprises MELINEX 504 ® and the tie layer comprises ethylene methyl ethyl acrylate.

15. The process of claim 12, further comprising the step of exposing the upper side of the pretreated substrate film to corona treatment prior to advancing the substrate past the extrusion station.

16. A process for forming a lenticular-coated substrate comprising the steps of:

a) continuously advancing a plastic substrate film past an extrusion station, wherein the substrate film has an upper side and a lower side;

b) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer; and c) continuously advancing the composite past a chill roll to form the lenticular-coated substrate, wherein the lenticular layer of the composite contacts the chill roll to form a lenticular pattern thereon;

wherein the upper side of the substrate film and the tie resin are sufficiently dissimilar to prevent chemical bonding between the film and the resin at temperatures less than about 650° F. to produce a strippable lenticular-coated substrate in which the force of adhesion between the tie layer and the substrate layer ranges from about 25 g/in to about 450 g/in.

17. The process of claim 16, wherein the tie resin comprises a mixture of polypropylene and an adhesive polymer, wherein the percent adhesive polymer in the mixture varies from greater than 0% up to about 20% to control the force of adhesion between the tie layer and the substrate layer in the lenticular-coated substrate.

18. The process of claim 17, wherein the adhesive polymer is selected from the group consisting of methyl ethyl acrylate, ethylene n-butyl acrylate, ethylene methyl butyl acrylate and mixtures thereof.

19. A process for forming a lenticular-coated substrate comprising the steps of:

a) continuously advancing a plastic substrate film past an extrusion station, wherein the substrate film has an upper side and a lower side;

b) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer;

c) continuously advancing the composite past a chill roll to form the lenticular-coated substrate, wherein the lenticular layer of the composite contacts the chill roll to form a lenticular pattern thereon;

d) cutting the lenticular pattern onto the chill roll with a precision gravure engraving machine, wherein the lenticular pattern comprises equally spaced lines;

e) color separating an image to produce a multiplicity of color-separated images;

f) for each color-separated image, engraving a gravure dot pattern with line spacings identical to the lenticular pattern onto a gravure print cylinder; and g) printing the image onto the lower side of the substrate film so that the gravure dot pattern of each gravure print cylinder is in registration with the lenticular pattern of the chill roll.

20. The process of claim 19, wherein the gravure dot pattern comprises greater than 400 dots/in.

21. The process of claim 19, wherein the gravure dot pattern comprises greater than 180 dots/in.

22. A process for forming a lenticular-coated substrate comprising the steps of:

a) continuously advancing a plastic substrate film past an extrusion station, wherein the substrate film has an upper side and a lower side;

b) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer;

c) continuously advancing the composite past a chill roll to form the lenticular-coated substrate, wherein the lenticular layer of the composite contacts the chill roll to form a lenticular pattern thereon; and d) extruding a subbing layer resin onto the lower side of the substrate film to minimize curl in the lenticular-coated substrate.

23. A process for forming a strippable plastic-coated substrate comprising the steps of:
   a) continuously advancing a plastic substrate film having an upper side and a lower side past an extrusion station, wherein the upper side is chemically incompatible with a molten thermoplastic tie resin so as to inhibit the bonding of the tie resin to the upper side of the substrate film;
   b) continuously coextruding the molten thermoplastic tie resin and a molten thermoplastic carrier resin onto the pretreated upper side of the substrate film from the extrusion station to form a composite comprising a substrate layer, a tie layer and a carrier layer, wherein the tie layer is superposed on the substrate film and the carrier layer is superposed on the tie layer; and
   c) continuously advancing the composite past a chill roll to form the strippable plastic-coated substrate, wherein the force of adhesion between the tie layer and the substrate layer ranges from about 25 g/in to about 450 g/in.

24. The process of claim 23, wherein the chill roll imparts a lenticular pattern into the carrier layer to form a lenticular strippable plastic-coated substrate.

25. The process of claim 23, wherein the force of adhesion between the tie layer and the substrate layer ranges from about 50 g/in to about 150 g/in.

26. The process of claim 23, wherein the carrier layer coating comprises polypropylene.

27. The process of claim 23, wherein the substrate film is comprises MELINEX 504® and the tie resin comprises ethylene methyl ethyl acrylate.

28. The process of claim 23, further comprising the step of exposing the upper side of the substrate film to corona treatment prior to advancing the substrate past the extrusion station.

29. The process of claim 23, wherein the tie layer coating comprises a mixture of polypropylene and an adhesive polymer, wherein the percent adhesive polymer in the mixture varies from greater than 0% up to about 20% to control the force of adhesion between the tie layer and the substrate layer in the strippable plastic-coated substrate.

30. The process of claim 29, wherein the adhesive polymer is selected from the group consisting of ethylene methacrylate, ethylene n-butyl acrylate, ethylene methyl butyl acrylate and mixtures thereof.

31. The process of claim 23, wherein the melt temperature of the tie layer coating and the carrier layer coating ranges from about 500° F. to about 600° F. to reduce the force of adhesion between the tie layer and the substrate layer in the lenticular-coated substrate.

32. A process for producing a three-dimensional image, comprising the steps of:
   a) cutting a lenticular pattern onto a chill roll with a precision gravure engraving machine, wherein the lenticular pattern comprises equally spaced lines;
   b) color separating an image to produce a multiplicity of color-separated images;
   c) for each color-separated image, engraving a gravure dot pattern with line spacings identical to the lenticular pattern onto a gravure print cylinder to form a multiplicity of engraved gravure print cylinders;
   d) continuously advancing a plastic substrate film past an extrusion station, wherein the substrate film has an upper side and a lower side;
   e) continuously coextruding a molten thermoplastic tie resin and a molten thermoplastic lenticular resin onto the upper side of the substrate film from the extrusion station to form a composite comprising a substrate layer, a tie layer and a lenticular layer, wherein the tie layer is superposed on the substrate film and the lenticular layer is superposed on the tie layer;
   f) continuously advancing the composite past the chill roll, wherein the lenticular layer of the composite contacts the chill roll to form the lenticular pattern thereon; and
   g) printing the image onto the lower side of the substrate film from the multiplicity of engraved gravure print cylinders so that the gravure dot pattern of each gravure print cylinder is in registration with the lenticular pattern of the chill roll to form the three-dimensional image.

33. The process of claim 22, wherein the gravure dot pattern comprises greater than 180 dots/in.

34. The process of claim 32, wherein the gravure dot pattern comprises greater than 400 dots/in.

* * * * *